United States Patent
Gurny (10) Patent No.: US 6,927,863 B2
(45) Date of Patent: Aug. 9, 2005

(54) APPARATUS FOR MEASURING A MEASUREMENT OBJECT

(75) Inventor: Werner H. Gurny, Wadgassen (DE)

(73) Assignees: Andrea Gurny-Brosch, Puttlingen (DE); Patrick Gurny, Saarbrucken (DE); Eric Gurny, Saarlouis (DE)

( * ) Notice: Subject to any disclaimer, the term of this patent is extended or adjusted under 35 U.S.C. 154(b) by 262 days.

(21) Appl. No.: 10/386,295

(22) Filed: Mar. 11, 2003

(65) Prior Publication Data

US 2003/0184765 A1 Oct. 2, 2003

(30) Foreign Application Priority Data

Mar. 13, 2002 (DE) .......................... 102 11 070

(51) Int. Cl.$^7$ .................... G01B 11/24; G01B 5/004
(52) U.S. Cl. .................... 356/602; 356/608; 33/503
(58) Field of Search ................... 356/601, 602, 356/608, 614, 615; 33/503, 549, 559; 702/167, 168, 169; 250/559.22, 559.23; 382/144

(56) References Cited

U.S. PATENT DOCUMENTS

| | | | |
|---|---|---|---|
| 4,908,951 A | | 3/1990 | Gurny .......................... 33/503 |
| 5,251,156 A | * | 10/1993 | Heier et al. .................. 702/167 |
| 5,615,489 A | * | 4/1997 | Breyer et al. ................. 33/503 |

* cited by examiner

Primary Examiner—Gregory J. Toatley, Jr.
Assistant Examiner—Roy M. Punnoose
(74) Attorney, Agent, or Firm—Wood Herron & Evans LLP (57) ABSTRACT

An apparatus for contactlessly measuring a measurement object is proposed, which has an optical sensor, the optical sensor having an optical probe having a light source and a measurement objective for directing a light beam onto a measurement object and a receiver device for detecting a light beam reflected from the measurement object and generating a corresponding measurement signal; an advancing apparatus for altering the distance between the optical sensor and the measurement object in a first coordinate direction in a manner dependent on the measurement signal generated by the receiver device; and an evaluation unit for determining the coordinates of the measurement point on the measurement object. In order to avoid or at least reduce a so-called contouring error that occurs in conventional measurement apparatuses, the receiver device has a position-sensitive receiver which generates an evaluatable measurement signal within a programmable measurement window; the advancing apparatus sets the distance between the optical sensor and the measurement object in such a way that the receiver of the receiver device receives the light beam reflected from the measurement object within the measurement window; and the evaluation unit determines the coordinates of the measurement point on the measurement object from the position of the optical sensor and the measurement signal generated by the receiver device.

17 Claims, 4 Drawing Sheets

APPARATUS FOR MEASURING A MEASUREMENT OBJECT

BACKGROUND OF THE INVENTION

1. Technical Field

The present invention relates to an apparatus for contactlessly measuring a measurement object, more precisely the surface of a measurement object, with an optical sensor.

2. Prior Art

Various embodiments of such measurement apparatuses for a contactless measurement of measurement objects are already disclosed in the prior art, contactless measurements often being combined with contact-making, i.e. mechanically probing, measurements.

Furthermore, such measurement apparatuses are known both for one-dimensional measurement only in one coordinate axis (z axis) and for multicoordinate measurement in the form of 2D or 3D measurement apparatuses in which, in addition to the z coordinate of the measurement point on the measurement object, the x and/or y coordinate thereof can also be detected.

Such a multicoordinate measurement apparatus is disclosed for example in U.S. Pat. No. 4,908,951 by W. H. Gurny. In the case of the apparatus disclosed in this document, both a contactless and a mechanically probing measurement of a measurement object are possible by means of a multisensor probing system. In this case, the measurement center sleeves of the optical sensor for the contactless measurement and of the mechanical probe head for the mechanically probing measurement are mounted on a common or on two separate slides which can be moved in the x and y coordinate directions. For automatic measurement-object contour detection, the optical sensor has a laser sensor.

The laser sensor disclosed in U.S. Pat. No. 4,908,951 follows the surface contour of the measurement object at a constant distance and thus achieves a contour detection in real time with high accuracy and a high scanning speed. This measurement principle is based on a so-called split-beam method, in which the reflective surface of the measurement object is used as a reference for focussing. The laser sensor directs a light beam via an objective onto the measurement object's surface to be measured, from which the light beam is reflected and guided via an optical arrangement onto a receiver device equipped with a plurality of differential diodes. On account of the imaging method employed in this system, the signal received by the receiver device drifts in the event of defocussing of the light beam on the surface of the measurement object and generates a differential signal which is fed to an advancing apparatus in the form of a servomotor. The advancing apparatus positions the optical sensor in accordance with the differential signal in the z coordinate direction in such a way that the measurement object's surface to be measured again lies in the focal plane of the objective. The position of the optical sensor in the z coordinate direction is detected by means of a suitable measurement system and fed to an evaluation unit.

On account of the continuous and automatic focussing of the measurement object, high measurement accuracies in conjunction with high scan speeds can be achieved with a measurement apparatus of this type. However, in this system, the z coordinate of a measurement point determined on the measurement object is affected by a so-called contouring error. This contouring error arises because the mechanical readjustment of the position of the optical sensor in the z coordinate direction is not exactly contemporaneous with the reading command of the receiver device, i.e. the receiver device reads out a measurement value for the z coordinate which does not precisely correspond to an exact focussing of the measurement object. This error is dependent, in particular, on the resolution of the measurement system, the scan speed and the geometrical errors in the z axis.

SUMMARY OF THE INVENTION

Taking this prior art as a departure point, the present invention is based on the object of providing an apparatus for measuring a measurement object contactlessly in which the contouring error explained above is avoided or at least significantly reduced.

In accordance with a first aspect of the invention, this object is achieved by means of an apparatus for contactlessly measuring a measurement object, having an optical sensor, the optical sensor having an optical probe (in particular laser probe) having a light source and a measurement objective for directing a light beam onto a measurement object and a receiver device for detecting a light beam reflected from the measurement object and generating a corresponding measurement signal; an advancing apparatus for altering the distance between the optical sensor and the measurement object in the z coordinate direction in a manner dependent on the measurement signal generated by the receiver device; and an evaluation unit for determining the coordinates of the measurement point on the measurement object. Furthermore, the receiver device is provided with a position-sensitive receiver which, within a predetermined measurement window, generates a measurement signal that can be evaluated by the evaluation unit, and the advancing apparatus sets the distance between the optical sensor and the measurement object in such a way that the receiver of the receiver device receives the light beam reflected from the measurement object within the measurement window; and the evaluation unit determines the coordinates of the measurement point on the measurement object from the position of the optical sensor and the measurement signal generated by the receiver device.

In the case of this measurement apparatus, the focussing of the measurement object does not have to be continuously readjusted during a scan operation, since the evaluation unit can evaluate the measurement signals within the entire measurement window of the receiver device. As a result of this, the contouring error described above is obviated, provided that the light reflected from the measurement object is received by the receiver device within the measurement window. Only if the reflected light drifts out of the measurement window does the focussing of the measurement object have to be readjusted. Consequently, the measurement apparatus of the invention is suitable in particular for measurement objects having very planar and flat surfaces, as often occur in the semiconductor industry. With a scan accuracy remaining consistently high, the scan speed can be significantly increased since the mechanical readjustment of the focussing is completely omitted or at least minimized, which leads to significantly reduced measurement times.

The position-sensitive receiver of the receiver device generates, within the measurement window, for example, a measurement signal with a linear characteristic curve with regard to the reception position of the reflected light within the programmed measurement window, which, in the evaluation unit, can be divided into digital measurement steps in order to generate the measurement values therefrom.

For easier and/or faster further processing of the measurement data, it may be advantageous to use a CCD chip as position-sensitive receiver, which CCD chip generates digital measurement data directly.

In addition to the operating mode "1st scan mode" already described, in which the distance between the optical sensor and the measurement object remains unchanged if the receiver of the receiver device receives the light beam reflected from the measurement object within the measurement window, and the distance is continuously set in such a way that the receiver of the receiver device receives the light beam reflected from the measurement object within the measurement window, two further operating modes are also possible with the apparatus of the invention. In the case of the operating mode "$2^{nd}$ scan mode", the distance between the optical sensor and the measurement object is continuously set in such a way that the receiver of the receiver device receives the light beam reflected from the measurement object in the centroid within the measurement window. This operating mode essentially corresponds to the method known in the case of the measurement apparatus from the prior art as described in the introduction. Furthermore, autofocus single-point measurements are also possible, in which the distance between the optical sensor and the measurement object is set individually for each measurement point in such a way that the receiver of the receiver device receives the light beam reflected from the measurement object in principle at any desired location within the measurement window.

Preferably, in addition, the transmission power of the light source can be controlled in a manner dependent on the light intensity—received by the receiver device—of the light beam reflected from the measurement object. In this way, the optical sensor can automatically react for example to different reflection properties of the measurement object and ensure a sufficiently strong reception signal at any time.

In accordance with a second aspect of the invention, the above object is achieved by means of an apparatus for measuring a measurement object, having an optical sensor, the optical sensor having an optical probe having a light source and a measurement objective for directing a light beam onto a measurement object and a receiver device for detecting a light beam reflected from the measurement object and generating a corresponding measurement signal and furthermore having a video sensor for detecting measurement points on the measurement object; an advancing apparatus for altering the distance between the optical sensor and the measurement object in a first coordinate direction in a manner dependent on the measurement signal generated by the receiver device; and an evaluation unit for determining the coordinates of the measurement point on the measurement object. In accordance with the invention, the receiver device has a position-sensitive receiver which generates an evaluatable measurement signal within a measurement window; the advancing apparatus sets the distance between the optical sensor and the measurement object in such a way that the receiver of the receiver device receives the light beam reflected from the measurement object within the measurement window; and the evaluation unit determines the coordinates of the measurement point on the measurement object from the position of the optical sensor and the measurement signal generated by the receiver device.

In a further refinement of the invention, the laser probe and the video sensor can preferably either be driven individually independently of one another or be used in combined fashion one after the other, in any desired alternate order.

In order to increase the measurement accuracy and the application flexibility, it is furthermore advantageous if the video sensor is set up in the optical axis of the focussing device on the same beam path as the laser probe, i.e. the laser beam of the laser probe and the light from the video sensor run through the same measurement objective with the same optical axis and the midpoint of the laser spot on the measurement object is adjusted precisely in the midpoint of the video measurement region. Consequently, the laser probe and the video sensor always detect the same measurement point on the measurement object.

In accordance with a third aspect of the invention, the abovementioned object is achieved by means of an apparatus for measuring a measurement object, having an optical sensor, the optical sensor having an optical probe having a light source and a measurement objective for directing a light beam onto a measurement object and a receiver device for detecting a light beam reflected from the measurement object and generating a corresponding measurement signal and furthermore having a video sensor for detecting measurement points on the measurement object; a mechanical probe head for the mechanically probing detection of measurement points on the measurement object; an advancing apparatus for altering the distance between the optical sensor and the measurement object in a first coordinate direction in a manner dependent on the measurement signal generated by the receiver device; and an evaluation unit for determining the coordinates of the measurement point on the measurement object. As in the case of the above-described embodiments in accordance with the first and second aspects of the invention, the receiver device has a position-sensitive receiver which generates an evaluatable measurement signal within a measurement window; the advancing apparatus sets the distance between the optical sensor and the measurement object in such a way that the receiver of the receiver device receives the light beam reflected from the measurement object within the measurement window; and the evaluation unit determines the coordinates of the measurement point on the measurement object from the position of the optical sensor and the measurement signal generated by the receiver device.

The mechanical probe heads that are additionally used in this third embodiment are already sufficiently known from the prior art. Preferably, the mechanical probe head and the laser probe and the video sensor of the optical sensor can either be driven independently of one another or can be driven in such a way that they can be used in combinations of two or three as a multisensor system one after the other in any desired, alternate order with one another.

BRIEF DESCRIPTION OF THE DRAWINGS

The measurement apparatus of the present invention is explained in more detail below using various preferred exemplary embodiments with reference to the accompanying drawings.

DETAILED DESCRIPTION OF THE PREFERRED EXEMPLARY EMBODIMENTS

First, a measurement apparatus according to a first exemplary embodiment of the invention and the functional principle on which the invention is based will be explained with reference to FIG. 1. Further preferred exemplary embodiments of the measurement apparatus according to the invention will subsequently be described with reference to FIGS. 2 to 4. In order to provide a better understanding, identical components of the measurement apparatus are provided with the same reference symbols in all the figures.

Figure 1:
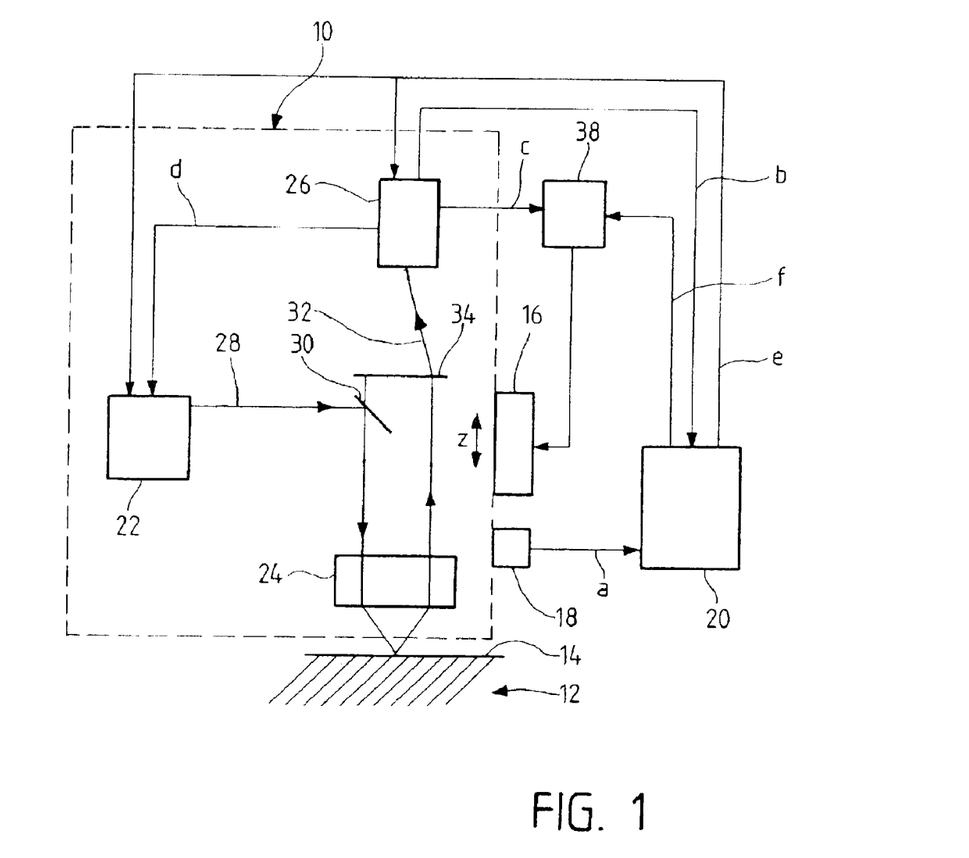
FIG. 1 is a schematic illustration of the functional principle of a first exemplary embodiment of a measurement apparatus according to the present invention.

The optical sensor 10—illustrated in FIG. 1—for measuring a measurement object 12 or the surface 14 of a measurement object 12 is preferably fitted to the measurement apparatus in such a way that it can be moved in the x-y plane, i.e. the plane perpendicular to the plane of the drawing. As a result of this, given a fixed measurement table for the measurement object 12, it is possible to achieve a relative movement between optical sensor 10 and measurement object 12 both in the x coordinate direction and in the y coordinate direction. What is equivalent to this construction is a measurement apparatus in which the optical sensor 10 is fixed in the x-y plane, but the measurement table can be moved in the x-y plane, so that it is again possible to realize the desired relative movements between measurement object 12 and optical sensor 10.

The optical sensor 10 can furthermore be displaced by means of an advancing apparatus 16, such as, for example, a servomotor, in the z coordinate direction. The position of the optical sensor 10 in the z coordinate direction is detected by means of a suitable measurement apparatus 18 and fed via a signal line a to an evaluation and/or control unit 20. An example of a suitable measurement apparatus 18 is an optical measurement system with a glass scale or any other position measurement system.

The optical sensor 10 of the measurement apparatus of FIG. 1 contains a first optical probe in the form of a laser probe, which has, in particular, a light source 22, a measurement objective 24 and a receiver device 26. The light source 22, preferably a laser diode or pulsed laser diode, emits a parallel-directed laser beam 28 which impinges on a half-mirror 30, which is inclined by 45° and is reflected from said half-mirror in the direction of the measurement object 12 to be measured. With the positioning of the optical sensor 10 set correspondingly by the advancing apparatus 16 in the z coordinate direction, the laser beam 28 reflected at the half-mirror 30 is focussed onto the surface 14 of the measurement object 12 by the measurement objective 24.

The laser beam 28 directed onto the surface 14 of the measurement object 12 is reflected at said surface and directed parallel again by the measurement objective 24. The light beam 32 reflected at the measurement object 12 then runs past the half-mirror 30 unobstructed and impinges on an optical arrangement or lens 34. This optical arrangement 34 focuses the reflected light beam 32 onto a capture region of the receiver device 26.

It should be pointed out at this juncture that the measurement objective 24 is preferably fitted to the optical sensor 10 in a manner that allows it to be exchanged, so that various measurement objectives with different optical properties can be used, depending on the application. If appropriate, the arrangement of the other optical elements of the optical sensor must then be adapted to the exchanged measurement objective, thereby ensuring the beam path illustrated in FIG. 1.

Instead of the differential diodes used for example in DE 38 06 686 A1 already cited, the receiver apparatus 26 of the measurement apparatus according to the invention is designed with a position-sensitive receiver which, within a programmable measurement window within its capture region, generates a measurement signal that can be evaluated by the evaluation unit 20. Preferably, a position-sensitive receiver is used which, within the measurement window, depending on the reception position of the reflected light beam 32, generates a measurement signal with a linear characteristic curve with regard to the reception position. The position-sensitive receiver may also be, by way of example, a CCD chip which generates digital measurement data directly.

With exact focussing of the surface 14 of the measurement object 12 by the focussing device 24, i.e. with exact positioning of the optical sensor 10 in the z coordinate direction and hence an exact distance between the optical sensor 10 and the measurement object 12, the receiver device 26 receives the light 32 reflected from the measurement object 12 precisely at the centroid of the programmed measurement window of the receiver device. If the measurement object 12 drifts somewhat out of the focus, then the light 32 reflected from the measurement object 12 also drifts out of the centroid of the measurement window. On account of the special choice of the receiver device 26 with a position-sensitive receiver, the receiver device can generate a measurement signal which indicates a measure of the deviation of the reception position of the reflected light 32 from the centroid within the measurement window.

The measurement signal thus generated is conducted via a signal line b to the evaluation and/or control unit 20. The evaluation and/or control unit 20 is programmed in such a way that it can determine, from the measurement signal fed to it, the extent of the deviation of the reception position of the reflected light 32 within the measurement window from the centroid of the measurement window of the receiver device 26. This evaluation is particularly simple and precise in the case of a linear characteristic curve of the measurement signal with regard to said positional deviation. However, it goes without saying that the present invention is not just restricted to receiver devices 26 having such a linear characteristic curve; it is also possible, by way of example, to use characteristic curves with quadratic, logarithmic or similar functionality. From the extent of the positional deviation, the evaluation and/or control unit 20 then determines the deviation in the z coordinate direction from the z position detected by the measurement apparatus 18 and thus the exact z coordinate of the measurement point on the measurement object 12.

The size of the measurement window and of the capture region of the receiver device 26 may either be fixedly predetermined or be freely selectable or programmable by the user within certain limits. Depending on the embodiment of the receiver device 26 and the optical elements of the optical sensor 10, the size of the measurement window may correspond to a displacement region in the z coordinate direction of up to 2,000 μm.

The receiver device 26 is additionally connected via a signal line c to a control unit 38 for the advancing apparatus 16 in the z coordinate direction. If the light 32 reflected from the measurement object 12 is no longer received within the predetermined measurement window by the receiver device 26, the z positioning of the optical sensor 10 has to be readjusted by means of a corresponding control signal from the receiver device 26. In contrast to the conventional measurement apparatuses described in the introduction, however, the continuous readjustment of the focussing is obviated, so that the above-described contouring errors can be avoided or at least significantly reduced. This applies in particular to measurement objects 12 having planar or very flat surfaces 14, since readjustments of the focusing are only seldom necessary in this case. The lack of continuous readjustments means that the scan speed and the accuracy of the measurement are also significantly increased.

The receiver device 26 is furthermore connected via a signal line d to the light source 22 of the laser probe. In this way, the transmission power of the light source 22 can be automatically regulated to the reflectivity of the surface 14 of the measurement object 12 depending on the light intensity of the reflected light 32 received by the receiver device 26.

Figure 3:
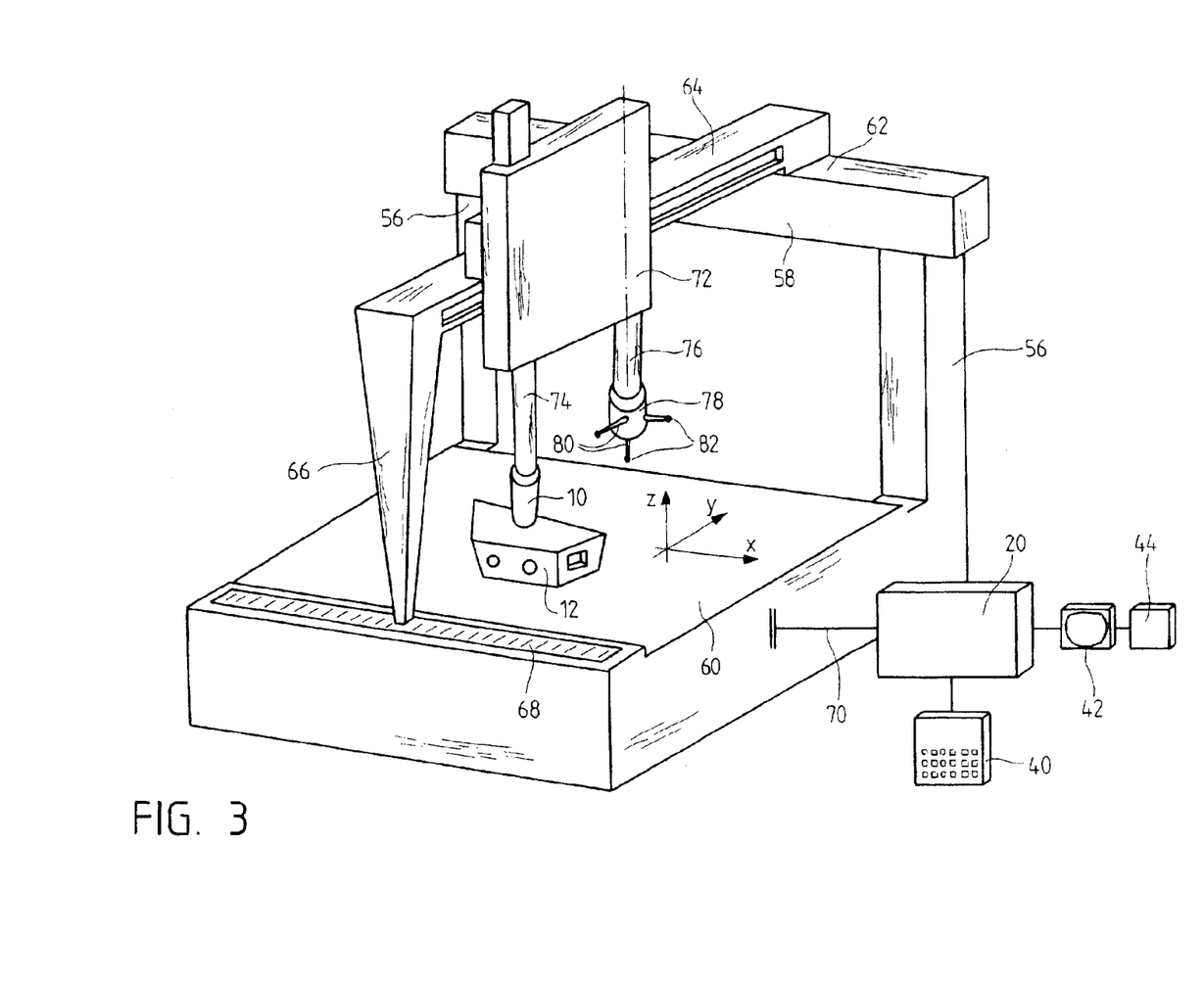
FIG. 3 shows a third exemplary embodiment of a measurement apparatus according to the present invention in a perspective illustration.
Figure 4:
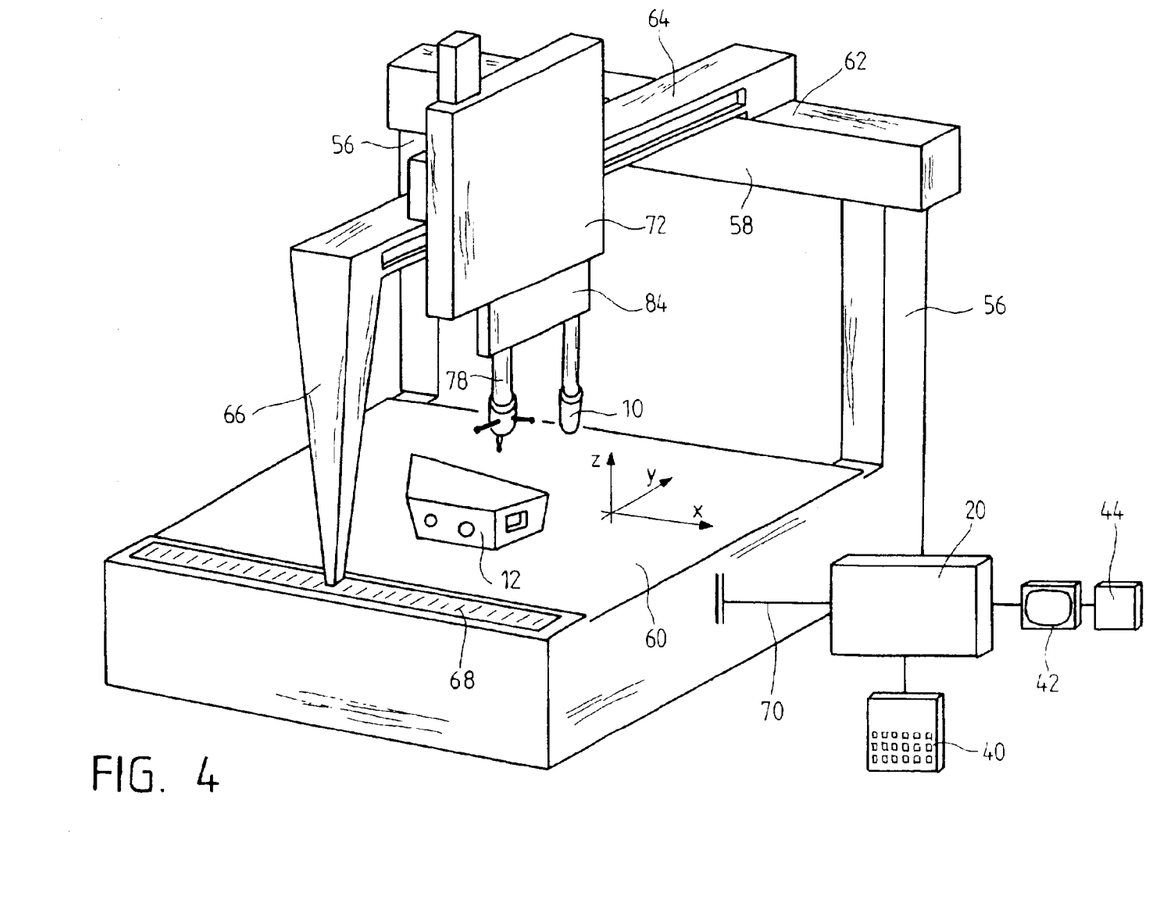
FIG. 4 is a perspective illustration of a fourth exemplary embodiment of a measurement apparatus according to the present invention.

During the determination of the z coordinate of the measurement point on the measurement object, the evaluation and/or control unit 20 processes additional data, such as reflection properties and special material characteristics of the measurement object and characteristics of the optical elements used in the optical sensor 10. Moreover, the evaluation and/or control unit 20 is connected via signal lines e and f to the control unit 38 of the advancing apparatus 16, the receiver device 26 and the light source 22, in order to control the operation of the measurement apparatus. Even though this is not illustrated in FIG. 1, the evaluation and/or control unit 20 is furthermore connected to an input apparatus 40, a display apparatus (monitor) 42 and an output apparatus (printer) 44, as is shown in FIGS. 3 and 4 which will be described later.

In addition to the above-described measurement method in which the focusing of the measurement object 12 is readjusted during scanning only if the reflected light 32 drifts out of the measurement window of the receiver device 26 and which is also referred to as "$1^{st}$ scan mode" here, further operating modes, such as the "$2^{nd}$ scan mode" and the "single-point measurement" are also possible with the measurement apparatus according to the present invention.

In the "$2^{nd}$ scan mode" the focussing of the measurement object 12 is continuously readjusted in a manner similar to that in the conventional measurement apparatuses. In this case, the distance between the optical sensor 10 and the measurement object 12, i.e. the z positioning of the optical sensor 10, is continuously set in such a way that the receiver of the receiver device 26 receives the light beam 32 reflected from the measurement object 12 at the centroid within the programmed measurement window. For autofocus single-point measurements, the distance between the optical sensor 10 and the measurement object 12 is set individually for each measurement point in such a way that the receiver of the receiver device 26 receives the light beam 32 reflected from the measurement object at any desired reception position within the programmed measurement window.

A second exemplary embodiment of a measurement apparatus according to the present invention will now be described with reference to FIG. 2. The measurement apparatus of FIG. 2 differs from the measurement apparatus illustrated in FIG. 1 essentially by the fact that the optical sensor 10 now also has a video sensor in addition to the laser probe.

Figure 2:
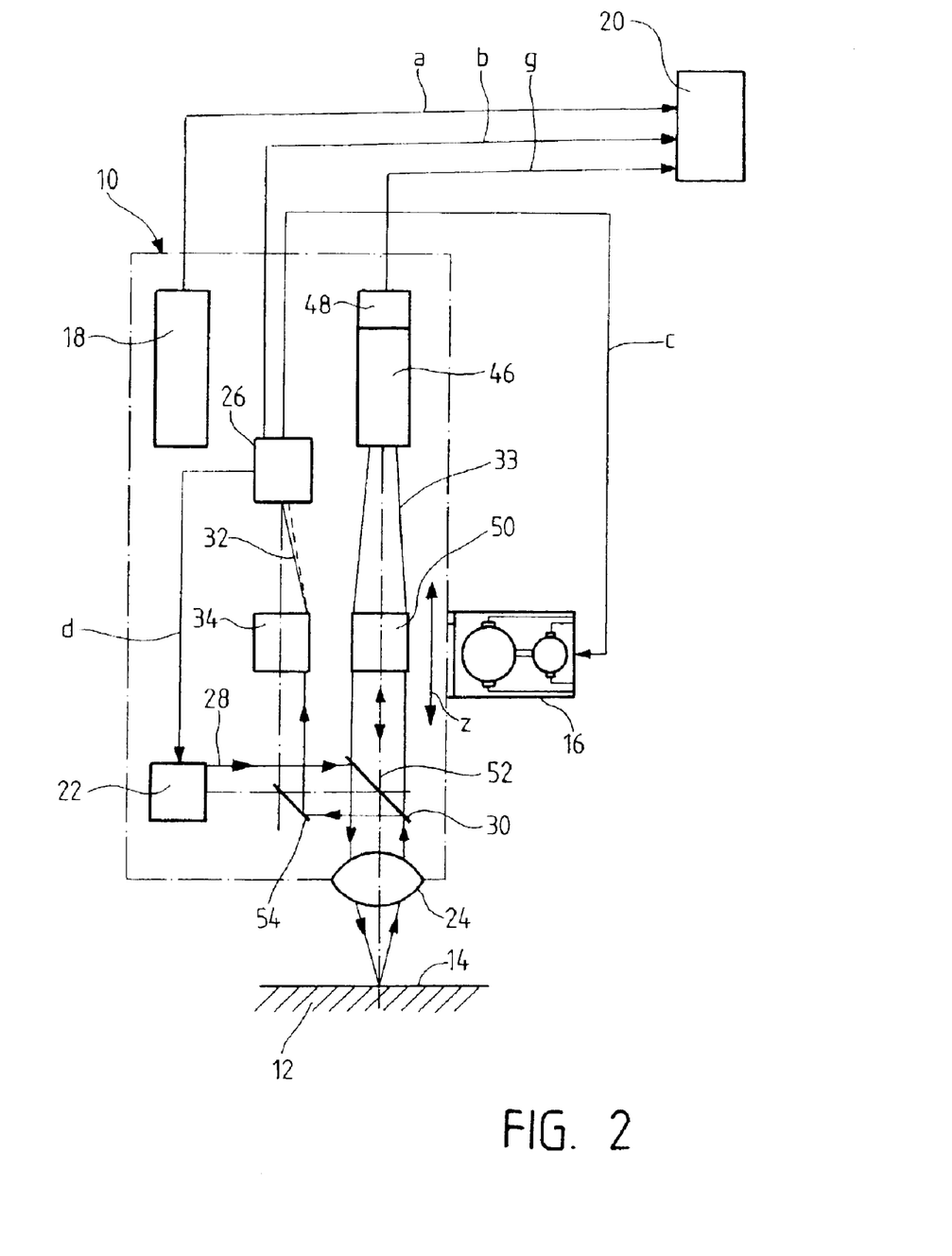
FIG. 2 is a schematic illustration of the functional principle of a second preferred exemplary embodiment of a measurement apparatus according to the present invention.

As illustrated in FIG. 2, the optical sensor 10 of the second exemplary embodiment additionally has a camera 46 and an image processing apparatus 48 connected to the evaluation and/or control unit 20 via a signal line g, which are component parts of the video sensor. The video sensor of the optical sensor 10 furthermore comprises the semitransparent mirror 30, which is inclined by 45°, the measurement objective 24 and an optical arrangement 50. The light 28 emitted by the camera 46 impinges on the semitransparent mirror 30 and runs through the latter to the measurement objective 24. The measurement objective 24 focuses the light beam of the camera 46, with corresponding positioning of the optical sensor 10 in the z coordinate direction, onto the surface 14 of the measurement object 12 to be measured. The light 33 reflected from the measurement object 12 is directed parallel again by the measurement objective 24 and then runs through the semitransparent mirror 30, inclined by 45°, unobstructed and then impinges on the optical arrangement or lens 50. This optical arrangement 50 focuses the reflected light beam 33 onto the camera 46.

The individual measurement points of a measurement object 12 to be measured are determined for example using a grey-scale image of the measurement object excerpt which is conditioned by the image processing apparatus 48 and digitized by a video processor of the evaluation unit 20. In this case, the measurement points are recorded at the outer contour of the measurement object, and the respective contours in the x and y coordinate directions are detected by edge finder routines in the grey-scale image, while in the z coordinate direction the measurement points are determined by the z coordinates determined and with the aid of the camera image and/or the laser probe.

As in the first exemplary embodiment of FIG. 1, the laser probe of the optical sensor 10 of FIG. 2 has a laser light source 22, a semitransparent mirror 30, a measurement objective 24, an optical arrangement 34 and a receiver device 26. In the preferred second exemplary embodiment, the laser beam 28 of the light source 22 is mirrored into the beam path of the video sensor via the semitransparent mirror 30, which is inclined by 45°, so that the measurement objective 24 is utilized both by the laser probe and by the video sensor with a common optical axis 52. In this way, the laser probe and the video sensor of the optical sensor 10 always detect the same measurement point on the measurement object 12, so that a compensation of an offset between the two sensors in the evaluation and/or control unit 20 is obviated. This construction is already known from DE 38 06 686 A1 and explained in greater detail therein.

Furthermore, a half-mirror 54 inclined by 4520 is provided in the optical sensor 10 of FIG. 2 in order to deflect the light 32 reflected from the measurement object 12 and the semitransparent mirror 30 in the direction of the optical arrangement 34 and the receiver device 26 of the laser probe. Instead of the half-mirror 54 shown here, it is also possible, in principle, to use a semitransparent mirror.

The method of operation of the laser probe corresponds to that of the measurement apparatus illustrated in FIG. 1. That is to say, in particular, that the receiver device 26 likewise has a position-sensitive receiver with a programmable measurement window and the above-described operating mode "$1^{st}$ scan mode" can be carried out. Moreover, laser probe and video sensor of the optical sensor 10 of FIG. 2 can be operated either independently of one another or in combined fashion, i.e. one after the other in any desired alternate order.

A further preferred exemplary embodiment of the present invention will now be described in more detail with reference to FIG. 3.

FIG. 3 shows the essential components of a multicoordinate measurement apparatus according to the present invention in a perspective illustration. The measurement apparatus is a measurement machine constructed in a gantry design and having a stationary gantry formed from two lateral supports 56, a crossbar 58 and a measurement table 60. The crossbar 58 simultaneously forms the guideway 62 for a transverse carrier 64, which is supported by a support 66 on a second guideway 68 on the edge of the measurement table 60. The transverse carrier 64 can be moved above the measurement table 60 in the x coordinate direction along the two guideways 62 and 68—arranged parallel—up to end stops (not illustrated). The measurement table 60 is designed for example as a rotary measurement table and fixed in the x-y plane.

The measurement machine is connected to the evaluation and/or control unit 20 via a signal line 70, which comprises the signal lines a to g, for example. In addition, an input apparatus 40 for the user, a monitor 42 and a printer 44 are connected to the evaluation and/or control unit 20. The control of the components of the measurement machine and the evaluation of the measurement signals are effected by the evaluation and/or control unit 20 in the manner explained above on the basis of the exemplary embodiments illustrated in FIGS. 1 and 2.

A slide 72 is fitted to the transverse carrier 64 of the measurement machine, which slide can be moved along the transverse carrier 64 in the y coordinate direction. Said slide 72 accommodates two center sleeves 74 and 76 which can be displaced in the z coordinate direction. As an alternative, two separate slides which can be moved in the y coordinate direction and which each accommodate one of the two center sleeves 74, 76 may also be provided on the transverse carrier 64. The two slides can be driven independently of one another in this case.

As already explained further above, it is also possible, as an alternative, to provide the multicoordinate measurement apparatus with a measurement table 60 that can be moved in the x-y plane and center sleeves 64, 76 that are fixed in the x-y plane, as a result of which it is possible to realize the same relative movements between the measurement object 12 and the optical sensor 10 and/or the mechanical probe 78.

The optical sensor 10, which may be constructed in particular in accordance with one of the exemplary embodiments of FIGS. 1 and 2 described above, is fitted to the lower end of the first center sleeve 74. A mechanical probe head 78 is fitted to the second center sleeve 76. For probing the measurement object 12, said mechanical probe head 78 has, in a known manner, at least one probe pin 80 with a probe ball 82. There are no limitations in the context of the present invention with regard to the construction and the method of operation of the mechanical probe head.

The mechanical probe head 78 may either be driven independently of the optical sensor 10 or be controlled in combined fashion with the latter, i.e. in any desired alternate order. In the case of the measurement apparatus illustrated in FIG. 1, the laser probe and the mechanical probe head can thus optionally be operated either independently of one another or in combined fashion. If the optical sensor 10 of the second exemplary embodiment of FIG. 2 is used instead, the laser probe, the video sensor and the mechanical probe head may optionally be combined either independently of one another or in any desired combination of two or three with one another, in order to ensure a high degree of flexibility with regard to the measurement tasks to be accomplished. Through the combined use of the individual sensors or probes, even complicated measurement tasks can be carried out in a short time and the measurement results of the individual systems can be reciprocally checked.

Finally, FIG. 4 shows a fourth exemplary embodiment of a multicoordinate measurement apparatus according to the present invention.

The measurement apparatus of FIG. 4 likewise has a mechanical probe head 78 and an optical sensor 10, and the optical sensor 10 may in turn be constructed in accordance with FIG. 1 or FIG. 2. In contrast to the third exemplary embodiment, the individual probes or sensors 78, 10 are not fitted to two separate center sleeves, but rather form a single multisensor probe head which is fixed to a common center sleeve 84 adjustable in the z coordinate direction. In this design, too, the laser probe, the video sensor and the mechanical probe head may optionally be combined either independently of one another or in any desired combination of two or three with one another.

What is claimed is:

1. An apparatus for measuring a measurement object, having an optical sensor, the optical sensor having an optical probe having a light source and a measurement objective for directing a light beam onto a measurement object and a receiver device for detecting a light beam reflected from the measurement object and generating a corresponding measurement signal; an advancing apparatus for altering the distance between the optical sensor and the measurement object in a first coordinate direction in a manner dependent on the measurement signal generated by the receiver device; and an evaluation unit for determining the coordinates of the measurement point on the measurement object, wherein, the receiver device has a position-sensitive receiver which generates an evaluatable measurement signal within a measurement window; the advancing apparatus sets the distance between the optical sensor and the measurement object in such a way that the receiver of the receiver device receives the light beam reflected from the measurement, object within the measurement window; and the evaluation unit determines the coordinates of the measurement point on the measurement object from the position of the optical sensor and the measurement signal generated by the receiver device.

2. The apparatus as claimed in claim 1, wherein the position-sensitive receiver of the receiver device generates a measurement signal with a linear characteristic curve within the measurement window, from which signal the evaluation unit can generate a measurement value.

3. The apparatus as claimed in claim 1, wherein the position-sensitive receiver of the receiver device is a CCD chip.

4. The apparatus as claimed in claim 1, wherein the apparatus furthermore has a control apparatus by means of which one of a plurality of operating modes of the optical sensor can be selected, wherein the operating modes are selected from the group of the following operating modes:

the distance between the optical sensor and the measurement object remains unchanged it the receiver of the receiver device receives the light beam reflected from the measurement object within the measurement window, but is continuously set in such a way that the receiver of the receiver device receives the light beam reflected from the measurement object within the measurement window ("$1^{st}$ scan mode")

the distance between the optical sensor and the measurement object is continuously set in such a way that the receiver of the receiver device receives the light beam reflected from the measurement object in the centroid within the measurement window ("$2^{nd}$ scan mode"), and the distance between the optical sensor and the measurement object is set in such a way that the receiver of the receiver device receives the light beam reflected from the measurement object within the measurement window ("single point measurement").

5. The apparatus as claimed in claim 1, wherein the size of the measurement window of the receiver device is programmable.

6. The apparatus as claimed in claim 1, wherein the transmission power of the light source can be controlled in a manner dependent on the light intensity—received by the receiver device—of the light beam reflected from the measurement object.

7. The apparatus as claimed in claim 1, wherein the optical sensor furthermore has a video sensor for detecting measurement points on the measurement object.

8. The apparatus as claimed in claim 1, wherein the apparatus furthermore has a mechanical probe head for the mechanically probing detection of measurement points on the measurement object.

9. The apparatus as claimed in claim 1, wherein the apparatus furthermore has a machine control unit for moving the optical sensor in at least one further coordinate direction.

10. The apparatus as claimed in claim 1, wherein the apparatus furthermore has a machine control unit for moving a measurement table in at least one further coordinate direction.

11. An apparatus for measuring a measurement object, having an optical sensor, the optical sensor having an optical probe having a light source and a measurement objective tar directing a light beam onto a measurement object and a receiver device for detecting a light beam reflected from the measurement object and generating a corresponding measurement signal and furthermore having a video sensor for detecting measurement points on the measurement object in a first coordinate direction in a manner dependent on the measurement signal generated by the receiver device; and an evaluation unit for determining the coordinate of the measurement point on the measurement object, wherein, the receiver device has a position-sensitive receiver which generates an evaluatable measurement signal within a measurement window; the advancing apparatus sets the distance between the optical sensor and the measurement object in such a way that the receiver of the receiver device receives the light beam reflected from the measurement object within the measurement window; and the evaluation unit determines the coordinates of the measurement point on the measurement object from the position of the optical sensor and the measurement signal generated by the receiver device.

12. The apparatus as claimed in claim 11, wherein the optical probe and the video sensor of the optical sensor can be used either independently of one another or in combined fashion.

13. The apparatus as claimed in claim 12, wherein the video sensor is set up in the optical axis of the measurement objective on the same beam path as light source and receiver device of the optical probe for the purpose of detecting an identical measurement point on the measurement object.

14. An apparatus for measuring a measurement object, having an optical sensor, the optical sensor having an optical probe having a light source and a measurement objective lot directing a light beam onto a measurement object and a receiver device for detecting a light beam reflected from the measurement object and generating a corresponding measurement signal and furthermore having a video sensor for detecting measurement points on the measurement object; a mechanical probe head for the mechanically probing detection of measurement points on the measurement object; an advancing apparatus for altering the distance between the optical sensor and the measurement object in a first coordinate direction in a manner dependent on the measurement signal generated by the receiver device; and an evaluation unit for determining the coordinates of the measurement point on the measurement object, wherein, the receiver device has a position-sensitive receiver which generates an evaluatable measurement signal within a measurement window; the advancing apparatus sets the distance between the optical sensor and the measurement object in such a way that the receiver of the receiver device receives the light beam reflected from the measurement object within the measurement window; and the evaluation unit determines the coordinates of the measurement point on the measurement object from the position of the optical sensor and the measurement signal generated by the receiver device.

15. The apparatus as claimed in claim 14, wherein the mechanical probe head and also the optical probe and the video sensor of the optical sensor can either be driven independently of one another or be used in a combination of two or three one after the other in any desired, alternate order.

16. The apparatus as claimed in claim 14, wherein the optical sensor and the mechanical probe head ore fitted to a common center sleeve of the apparatus.

17. The apparatus as claimed in claim 14, wherein the optical sensor is fitted to a first center sleeve of the apparatus and the mechanical probe head is fitted to a second center sleeve at the apparatus, wherein the first and the second center sleeves are fitted to a common measurement slide or can be moved independently of one another.

* * * * *

UNITED STATES PATENT AND TRADEMARK OFFICE
CERTIFICATE OF CORRECTION

PATENT NO. : 6,927,863 B2  
APPLICATION NO. : 10/386295  
DATED : August 9, 2005  
INVENTOR(S) : Werner H. Gurny Page 1 of 1

It is certified that error appears in the above-identified patent and that said Letters Patent is hereby corrected as shown below:

In the Specification

Column 8  
Line 42, delete "4520", insert --45°--.

In the Claims

Column 10  
Line 47, Claim 4, delete "unchanged it the", insert --unchanged if the--.  
Line 53, Claim 4, delete "("1$^{st}$ scan mode")", insert --("1$^{st}$ scan mode"),--.

Column 11  
Line 22, Claim 11, delete "objective tar", insert --objective for--.  
Line 27, Claim 11, delete "object in", insert --object; an advancing apparatus for altering the distance between the optical sensor and the measurement object in--.  
Line 30, Claim 11, delete "the coordinate of", insert --the coordinates of--.

Column 12  
Line 6, Claim 14, delete "objective lot", insert --objective for--.  
Line 38, Claim 16, delete "head ore fitted", insert --head are fitted--.

Signed and Sealed this  
Twenty-fifth Day of November, 2014

Michelle K. Lee  
*Deputy Director of the United States Patent and Trademark Office*